S. H. HORN.
Earth-Auger.

No. 164,086.

Patented June 8, 1875.

Witnesses.
F. O. Clark
Arthur Wright

Inventor,
Sidney Hartwell Horn.
Attorney, Thomas G. Orwig.

THE GRAPHIC CO.PHOTO-LITH.39 & 41 PARK PLACE, N.Y.

UNITED STATES PATENT OFFICE.

SIDNEY HARTWELL HORN, OF BLOOMFIELD, IOWA.

IMPROVEMENT IN EARTH-AUGERS.

Specification forming part of Letters Patent No. 164,086, dated June 8, 1875; application filed March 23, 1875.

*To all whom it may concern:*

Be it known that I, SIDNEY HARTWELL HORN, of Bloomfield, in the county of Davis and State of Iowa, have invented an Improved Earth-Boring Apparatus, of which the following is a specification:

The object of my invention is to provide an improved auger and operating mechanism for boring wells. It consists, first, in forming an auger with a series of inclined cutting-lips, and vertical reamers, combined with a shaft-socket, in such a manner that the complete auger will have a rigid bottom closed sufficiently to hold and elevate sand. Second, in a hub to slide on the auger-shaft, and extend braces to the auger, and thereby form a skeleton frame to support an adjustable cylinder or bucket. Third, in mounting a sweeping-beam upon a traveling-wheel to operate the auger, all as hereinafter fully set forth.

Figure 1:
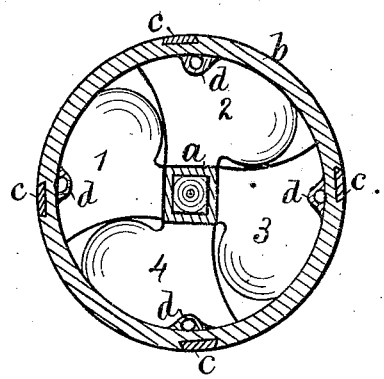

Figure 1 of my drawing is a top-plan view of my auger. It may vary in size as desired.

$a$ represents a square socket designed to receive and hold the end of the auger-shaft. The under side of the socket terminates with, or has attached thereto, a centering-point of any suitable form desired. 1 2 3 4 are inclined cutting-lips extending horizontally from the socket $a$, to which they are rigidly attached in any suitable way. $b\,b$ is a circular rim, rigidly attached to the outside inclined edges of the lips 1 2 3 4, with screw-bolts or in any suitable way. $c\,c$ represent reamers rigidly attached in vertical grooves on the outside of the rim $b$. $d\,d$ represent sockets for receiving the ribs and braces of a skeleton bucket-frame.

Figure 2:
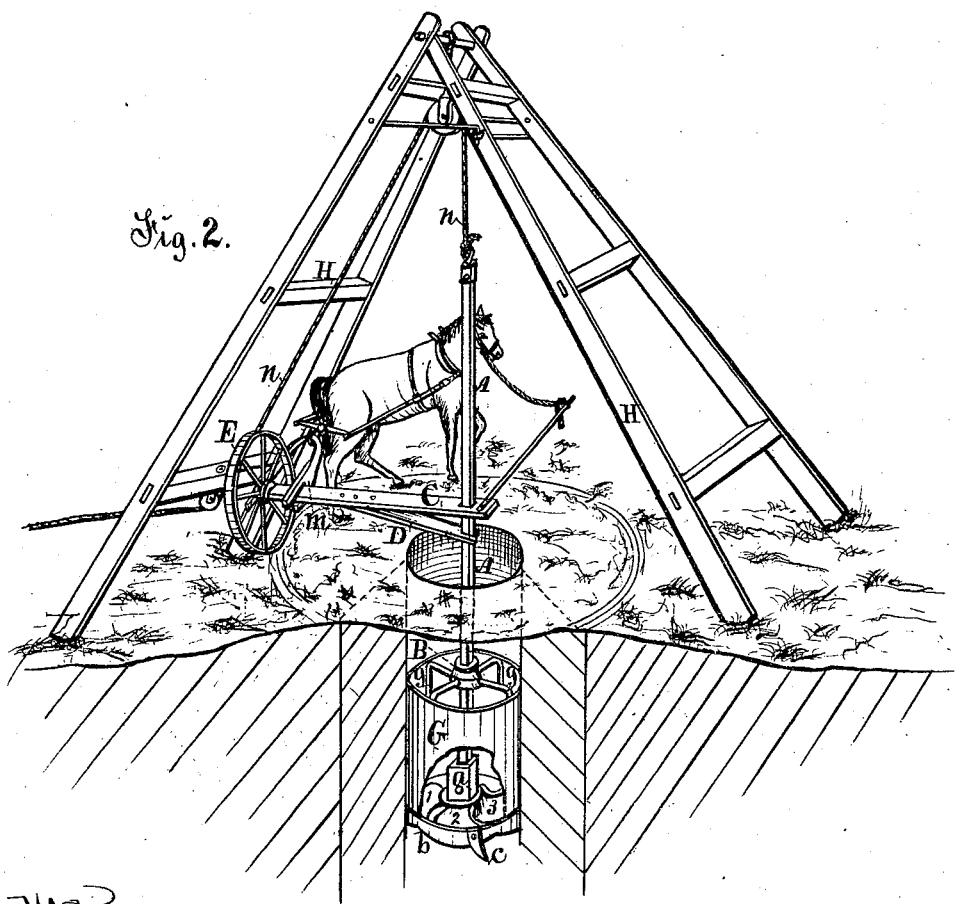

Fig. 2 is a perspective view, illustrating the construction and operation of my complete apparatus.

A is the square auger-shaft. B is a hub sliding upon the shaft A. $g\,g$ represent a series of bent braces or ribs, extending from hub B to the sockets $d$ on the auger-rim $b$, to form a skeleton frame and to brace and strengthen the auger. C is a sweeping-beam with a mortise at its inner end, through which the shaft A slides up and down. D is a branch on the under side of the beam C to form a second bearing against the shaft A, and to support and strengthen the beam C. E is a traveling-wheel on the outer end of the beam C, and serves to keep the beam elevated in proper position relative to the animal applied to move the sweeping-beam C, and thereby rotate the shaft A and operate the auger. $m$ is a yoke attached to the end of the axle in such a manner as to inclose the wheel E and form a suitable hitching device. G is a cylindrical movable bucket formed of hinged sections in such a manner that it can be readily opened to discharge dirt and to be removed from the auger. H H represent a portable derrick. $n\,n$ is a rope running over pulleys attached to the derrick and connected by means of a suitable swivel-coupling with the shaft A, for the purpose of suspending and raising and lowering the shaft and auger. A suitable windlass may be attached to the derrick to lengthen and shorten the rope $n$, as required.

In the practical operation of my invention, the beam C, supported by the wheel E, is designed to be moved by a horse hitched to the yoke $m$ in such a manner that the beam will sweep around the well and rotate the shaft A and the auger-lips 1 2 3 4 to shave the soil and sink the auger to form a bore. The vertical reamers C will, at the same time, aid the cutting-lips in loosening the soil, and also form a smooth wall. The centering-point on the bottom of the socket $a$ will keep the auger and shaft perpendicular. The mortise in the beam C will allow the shaft A to descend as the auger sinks into the bore. When the bucket G is filled with loose soil or sand, the auger with its contents is lifted by means of winding the rope $n$ upon a suitable drum or windlass. The form and relative positions of the inclined cutting-lips 1 2 3 4 prevent the loose contents from dropping from the bucket while ascending. By detaching the auger from the shaft, the contents can be readily emptied.

A simple and complete portable well-boring apparatus is thus provided to operate advantageously in all kinds of ground and sand.

I claim as my invention—

1. In a well-boring apparatus, the socket $a$ having a centering-point on its under side, the inclined cutting-lips 1 2 3 4, the rim $b\,b$, carrying the reamers $c$, when arranged and combined substantially as and for the purposes shown and described.

2. The hub B, having radiating-braces $g$, in combination with the rim $b\ b$, to brace the auger and support the bucket G, substantially as and for the purposes shown and described.

3. The sweeping-beam C, supported upon the traveling-wheel E, in combination with an auger-shaft, A, substantially as and for the purposes shown and described.

SIDNEY HARTWELL HORN.

Witnesses:
HOWARD WILLEY,
D. S. KELLER.